United States Patent [19]

Goede et al.

[11] 4,303,849

[45] Dec. 1, 1981

[54] PROCESS AND APPARATUS FOR CHARGING A CAPACITOR AND APPLICATION OF THE PROCESS

[75] Inventors: Simon Goede, Wetzikon; Kurt Fischer, Uster, both of Switzerland

[73] Assignee: Zellweger Uster Limited, Uster, Switzerland

[21] Appl. No.: 104,715

[22] Filed: Dec. 18, 1979

[30] Foreign Application Priority Data

Feb. 2, 1979 [CH] Switzerland .................. 1031/79

[51] Int. Cl.³ .................. H05B 41/32; H02J 15/00
[52] U.S. Cl. .................. 315/241 P; 315/311; 315/240; 320/1
[58] Field of Search ............... 315/119, 149, 151, 159, 315/240, 241 P, 241 R, 245, 309, 311; 320/1; 328/11; 361/58, 106; 323/66, 68, 69, 80

[56] References Cited

U.S. PATENT DOCUMENTS

| | | | |
|---|---|---|---|
| 3,375,403 | 3/1968 | Flieder | 315/240 |
| 3,560,842 | 2/1971 | Caprari | 315/311 X |
| 3,868,562 | 2/1975 | Marshall | 320/1 X |
| 4,074,170 | 2/1978 | Orban | 315/241 P X |

Primary Examiner—Eugene R. La Roche
Attorney, Agent, or Firm—Criag and Antonelli

[57] ABSTRACT

A process and apparatus for charging a capacitor, particularly for flash guns with a fast flash series, so as to achieve a short charging time while avoiding a high charging current pulse, the charging current during the course of the charging being regulated to a value which at least approaches a constant. The time constant of the charging circuit is altered during the charging process by a controlled resistance arrangement which is controlled in dependence upon the charging voltage of the capacitor.

14 Claims, 6 Drawing Figures

PROCESS AND APPARATUS FOR CHARGING A CAPACITOR AND APPLICATION OF THE PROCESS

The invention relates to a process and an apparatus for charging a capacitor and for the application of the process, especially in a high-efficiency flash gun.

Flash guns of the type known in photography include a control circuit wherein a capacitor charged from the supply voltage via a transformer and a rectifier is discharged at a specific time by closing of a switch to effect ignition of a flash lamp. Flash guns of this kind do give sufficient light for the intended purpose, but they have various disadvantages when it comes to producing intensive flashes of light in very rapid succession, for example, in a sequence of less than one second.

A capacitor discharged by the closing of a switch to effect activation of the flash gun or after the triggering of a flash of light, cannot, for practical reasons, be directly connected to a low-resistance direct-current supply for charging, because then an intolerably-high starting current surge for the circuit elements concerned would result since, at the moment of connection, the unchanged capacitor acts practically as a short circuit for the direct-current supply. This pulsating load would become noticeable on the primary side of the transformer and would lead to an intolerably-high pulsating load in the relevant mains supply.

This problem may be alleviated by inserting a charging resistor between the direct-current supply and the capacitor which is to be charged, in order to limit the charging current pulse to a tolerable magnitude. The magnitude of the charging resistor may be dimensioned such that the initial value of the exponentially-decreasing charging current in a given case just reaches a predetermined maximum value. However, since the charging current very quickly becomes smaller immediately after the start of the charging process, the maximum output of the direct-current supply and the capacity of the charging circuit to transfer energy is very badly utilized with such an arrangement, whereby the charging time is also lengthened considerably, and through this, the production of a fast succession of flashes is rendered impossible.

An ideal solution to this problem would lie, for example, on the one hand, in lowering the starting current for the charging process, and on the other hand, in raising the end current value, on having reached the required charging voltage. This could be achieved, for example, by charging the capacitor via an inductor of high inductance and of small ohmic resistance, which would give minimum ohmic losses the charging process. However, several factors indicate that this solution would be less than ideal, the most serious of which is the great expenditure in material for such an inductor for the amount of energy provided for a high-efficiency flash gun. A great expenditure would, however, also be required for the exact regulation of the amounts of energy which are temporarily stored in the inductor and applied to the capacitor.

A regulation of the charging current during the charging process could likewise be achieved by an electronic control of the charging process. With an efficiency of 50%, energy of 500 Ws can thus be transmitted within 0.5 seconds to the capacitor in the most favorable case. This optimum case would be achieved with the use of a constant current-supply and this would give a flash sequence of 0.5 seconds.

Constant current supplies of an electronic construction are known, per se. However, because an efficiency of 50% is the most which can be achieved with respective regulation, the semiconductor components which are required in order to realize such a constant current supply as that required for the intended application must be able themselves to absorb an amount of energy which is equal to that transmitted to the capacitor, and they have to be able to give off energy as heat within the charging time, so that a fast succession of flashes is possible. The use of such semiconductors at present leads to an extraordinarily expensive circuit arrangement, which is not suitable for commercial reasons, and therefore, for practical reasons, does not provide a practical solution to the present problem.

It is therefore an object of the present invention to provide a process and apparatus for charging a capacitor, to be used in a high-efficiency flash gun, which in an extremely economical manner obviates the above-described disadvantages inherent in heretofore-known arrangements of this type.

The general idea for solving the foregoing problem, upon which this invention is based, consists in changing the time constant of the charging circuit during the charging process, in order to achieve a flow of charging current which at least approaches a constant. This change can take place constantly or in stages.

One possible means of realizing this idea lies, for example, in altering a connected resistance arrangement, which is located between a direct current supply and the capacitor, preferably in stages, during the charging process of the capacitor. The capacitor is to be charged such that the magnitude of resistance of the resistance arrangement decreases with continued charging of the capacitor.

These and other objects, features and advantages of the invention as described by way of example with the aid of the accompanying drawings will become apparent from the following detailed specification.

The same reference symbols are used in all the figures for the identification of corresponding parts.

Figure 1:
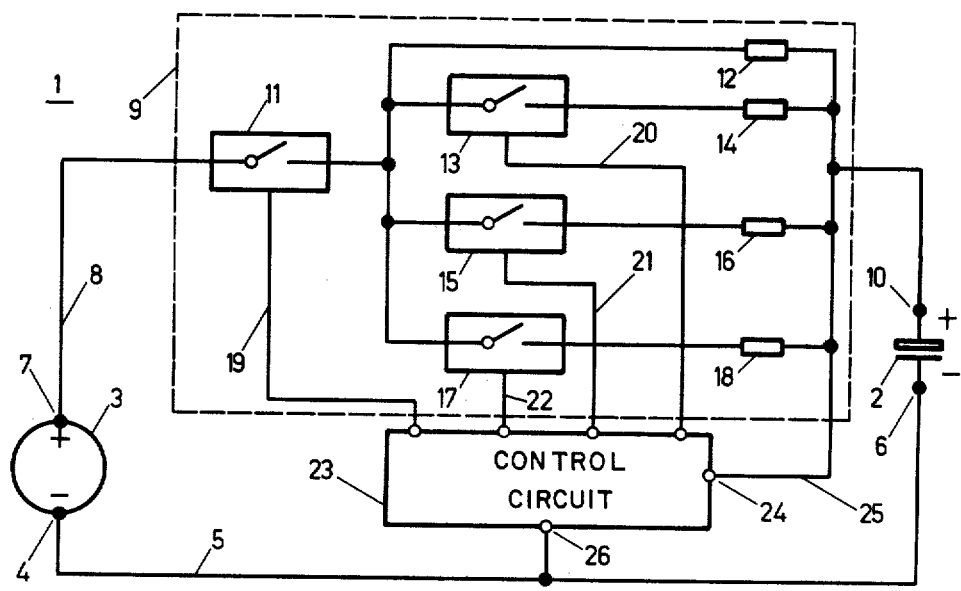
FIG. 1 is a schematic block circuit diagram of a first embodiment of the present invention.

FIG. 1 is a block circuit diagram of a first embodiment of an apparatus 1 for charging a capacitor 2. One terminal 4 of a direct-current supply 3 is connected directly to the negative terminal 6 of the capacitor 2. On the other side, a conduction line 8 leads from the positive terminal 7 of the direct-current supply 3 to the positive terminal 10 of the capacitor 2 via a controllable resistance arrangement 9.

The controllable resistance arrangement 9 has a plurality of parallel paths including a first controllable switch 11 and a first charging resistor 12, a second controllable switch 13 and a second charging resistor 14, a third controllable switch 15 and a third charging resistor 16, as well as a fourth controllable switch 17 and a fourth charging resistor 18.

The control conduction lines 19, 20, 21, and 22, respectively, lead to the controllable switches 11, 13, 15, and 17, respectively, and connect corresponding control outputs of a control arrangement 23 to these controllable switches. A control input terminal 24 of the control arrangement 23 is connected via a conduction line 25 to the positive terminal 10 of the capacitor 2 which is to be charged, while a zero-potential terminal 26 of the control arrangement 23 is connected via the conduction line 5 to the negative terminal 6 of the capacitor 2 which is to be charged.

An embodiment of a control arrangement is explained in more detail later on in this description with the aid of FIGS. 4, 5, and 6. However, the general task of the control arrangement 23, being dependent on the charging voltage of the capacitor 2, is to successively close the individual controllable switches 11, 13, 15 and 17. As a result of the chosen order of connection and the successive closing of the named controllable switches, a successive parallel connection of the second, third and fourth charging resistors 14, 16 and 18, respectively, to the first charging registor 12 results. Thereby, the total resistance of the resistance arrangement 9 is decreased in stages, and thereby, the time constant, which is the product of this total resistance and the capacity of the capacitor 2, is reduced in stages.

Figure 2:
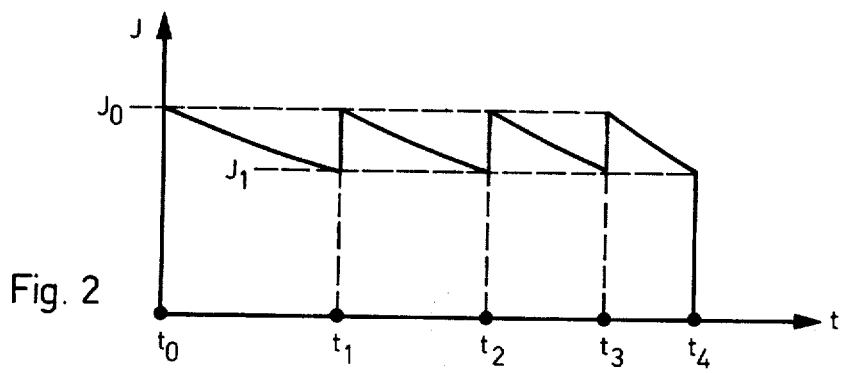
FIG. 2 is a diagram a current flow.

By this means, instead of using a charging current which falls off exponentially from a maximum value, a charging current flow can be obtained during charging having approximately the form shown in FIG. 2. The charging current thus at least approaches a constant value during the whole charging process, so that not only a good utilization of the direct current supply is achieved for charging the capacitor 2 effectively, but also an excessive starting current surge, or an excessive charging time, as would happen with only one resistance value, is avoided.

At time $t_o$, at which the controllable switch 11 is closed by a controlling signal on the conduction line 19, the capacitor 2 is still uncharged and the maximum charging current $J_o$ is restricted by the first charging resistor 12. In the first charging interval from the time $t_0$ to time $t_1$, the charging current decreases exponentially to a value $J_1$, at which time the capacitor 2 has been charged to a charging voltage $U_1$.

The control arrangement 23 is constructed in such a way that, having reached this charging voltage $U_1$, the second controllable switch 13 is closed via the control conduction line 20, and thereby the second charging resistor 14 is connected in parallel with the first charging resistor 12. By this parallel connection of the charging resistors 12 and 14, the first controllable switch 11 remaining closed, the effective resistance of the resistance arrangement 9 is diminished to an extent that at the time $t_1$, the charging current flows again from the value $J_0$.

By connection of the second charging resistor 14 in parallel with the first charging resistor 12, the time constant $T = R.C$, which is the product of the series resistance of the resistance arrangement 9 and the capacitance of the capacitor, is decreased by one stage. By this means, the second charging interval, namely, the time span from time $t_1$ to time $t_2$, at which the charging current has again sunk to value $J_1$, is shortened with respect to the first charging interval. At the time $t_2$ the charging voltage of the capacitor 2 has now reached a value $U_2$.

The control arrangement 23 is designed in such a way that, upon reaching the charging voltage $U_2$, it also closes the controllable switch 15 via the other control conduction line 21. By this means, the third charging resistor 16 is connected in parallel with the first and second charging resistors 12 and 14 which have already been connected in parallel with each other, so that now the time constant T of the charging circuit is again decreased. The third charging interval from time $t_2$ to time $t_3$, at which the charging current has again fallen to the value $J_1$, is again shorter than the previous charging interval ($t_1$ to $t_2$), as a result of the time constant being once again shortened. At time $t_3$ a charging voltage $U_3$ of the capacitor 2 is reached, and the control arrangement 23 is such that upon detection of this charging voltage $U_3$, it now also closes the fourth controllable switch 17 via the other control connection line 22. By this means, the fourth charging resistor 18 is connected in parallel with the first, second and third charging resistors 12, 14 and 16, which have already been connected in parallel with each other. This further parallel connection brings the charging current, which in the time up to time $t_3$ has fallen to the value $J_1$, back to the value $J_0$ again and a final charging interval from $t_3$ to $t_4$ follows on from the time $t_3$.

At the time $t_4$, the complete charging of the capacitor 2 is reached at the intended level of charging voltage $U_4$. The control arrangement 23 is designed such that after having reached the charging voltage $U_4$, the first controllable switch 11 is reopened by a signal directed to it via the control conduction line 19. The complete charging of the capacitor 2 having been accomplished, the flash gun is now available for a possible triggering to produce a flash of light through ignition of a flash lamp connected to the capacitor 2.

The control arrangement 23 is preferably constructed in such a way that, after the capacitor 2 has been discharged via the flash lamp, its recharging occurs only after a delay, by a delayed closing of the switch member 11, that is, after the flash lamp has been deionized. This prevents an undesirable continuous ignition of the flash lamp.

Figure 3:
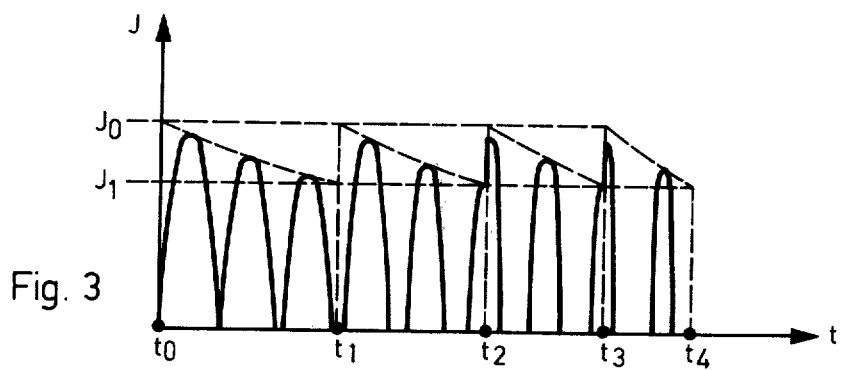
FIG. 3 is another current flow diagram.

While the current flow according to FIG. 2 corresponds to the case in which the resistance arrangement 9 is connected to a substantially-constant direct-current supply, FIG. 3 shows a possible current flow in the charging current ciruit with a supply which provides a pulsating direct current, for example, from a full-wave rectifier. Here also the envelope of the charging current flows so as to approach a constant value.

Figure 4:
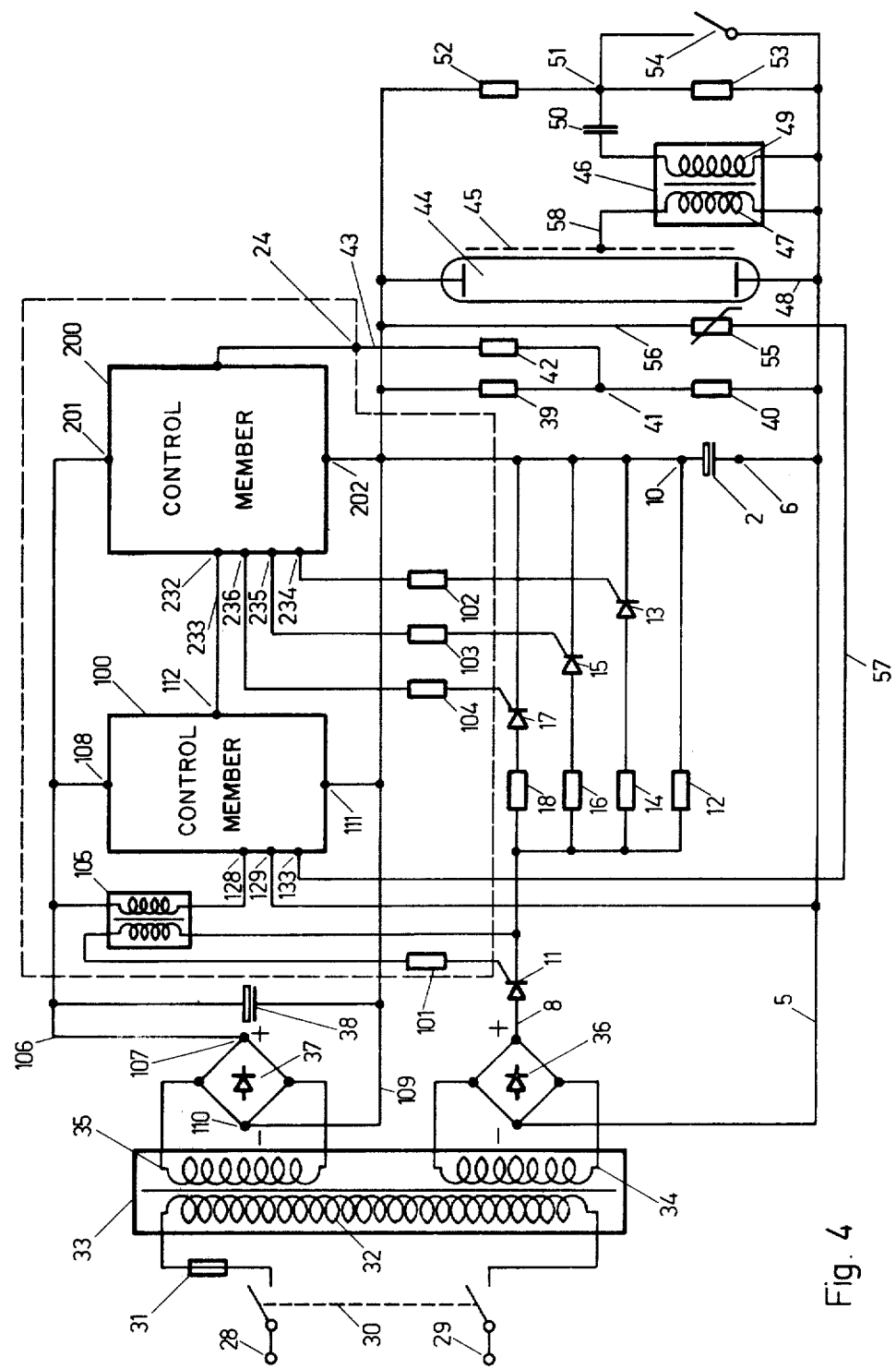
FIG. 4 is a circuit diagram of a second embodiment of the present invention.

FIG. 4 shows a circuit diagram of a second embodiment of this invention. By means of two mains terminals 28 and 29, the flash gun can be connected to a mains supply, for example, 220 V, 50 Hz. By means of a 2-terminal mains switch 30 and a fuse 31, the primary winding 32 of the mains transformer 33 is connectable to the mains supply.

The mains transformer 33 has a secondary winding 34 and a tertiary winding 35. To the secondary winding 34 is connected a first full-wave rectifier 36 and to the tertiary winding 35 is connected a second full-wave rectifier 37. The full-wave rectifier 36 provides the supply of charging current to the circuit of capacitor 2, while the full-wave rectifier 37 is fitted with a smoothing capacitor 38 and provides a supply for the control arrangement 23. The charging current circuit and control arrangement of the flash lamp correspond in their construction to that shown in FIG. 1, which is why the same reference numbers are used in FIG. 4 as in FIG. 1 for the corresponding switching elements.

A thyristor forms the first controllable switch 11, to which the first charging resistor 12 is connected in series. The second charging resistor 14 is connected to a second thyristor acting as the second controllable switch 13; the third charging resistor 16 is connected to a third thyristor acting as the third controllable switch 15; and the fourth charging resistor 18 is connected to a fourth thyristor acting as the fourth controllable switch 17. By firing the thyristors 13, 15 and 17 in a controlled manner, the charging resistors 14, 16 and 18 can be selectively and progressively connected in parallel with the first charging resistor 12 in the manner already described.

The flash gun has the control arrangement 23, as in the first embodiment described with the aid of FIG. 1, which includes a first control member 100 and a second control member 200. A first gate resistor 101 is allocated to the first thyristor 11; a second gate resistor 102 is allocated to the second thyristor 13; a third gate resistor 103 is allocated to the third thyristor 15; and a fourth gate resistor 104 is allocated to the fourth thyristor 17. Also, between the first control member 100 and the first controllable connecting member 11, a firing transformer 105 is arranged.

In parallel with capacitor 2, at which the charging voltage builds up during the charging process, there is a voltage divider consisting of resistors 39 and 40. The voltage divider point 41 is connected to the input 24 of the control arrangement 23 via another resistor 42 and a conduction line 43.

Likewise, connected in parallel with the capacitor 2 is a flash lamp 44 with an ignitor electrode 45. To the flash lamp 44 is allocated an ignition transformer 46, whose secondary winding 47 is connected at one side to the cathode 48 of the flash lamp 44 and via the conduction line 5 to the negative terminal of the rectifier 36, and at the other side via a conduction line 58 to the ignitor electrode 45 of the flash lamp. The primary winding 49 of the ignition transformer 46 is connected at one side to the negative terminal of the rectifier 36 via the conduction line 5, and at the other side via a capacitor 50 to the voltage divider point 51 of a voltage divider consisting of resistors 52 and 53. This voltage divider of the resistors 52 and 53 lies in parallel with the flash lamp 44 and the capacitor 2. By means of a switch 54, which is positioned between the voltage divider point 51 and the conduction line 5, the capacitor 50 can be discharged. By means of the current surge, arriving in the primary winding 49 of the ignition transformer 46, during the discharge process of the capacitor 50, a high voltage is produced at the secondary winding 47 which leads to the ignitor electrode 45, and lights the flash lamp 44, the previously-charged capacitor 2 is discharged suddenly via the flash lamp.

Near the flash lamp 44 a resistor 55 having a negative temperature coefficient is arranged for measuring the temperature of the flash lamp. It is located in a circuit with the anode of the flash lamp 44 via a conduction line 56 and a conduction line 57 to the control member 100 of the control arrangement 23. The resistor 55 indirectly provides the temperature measurement and, as will be shown later on, provides protection for the flash lamp against overloading.

Figure 5:
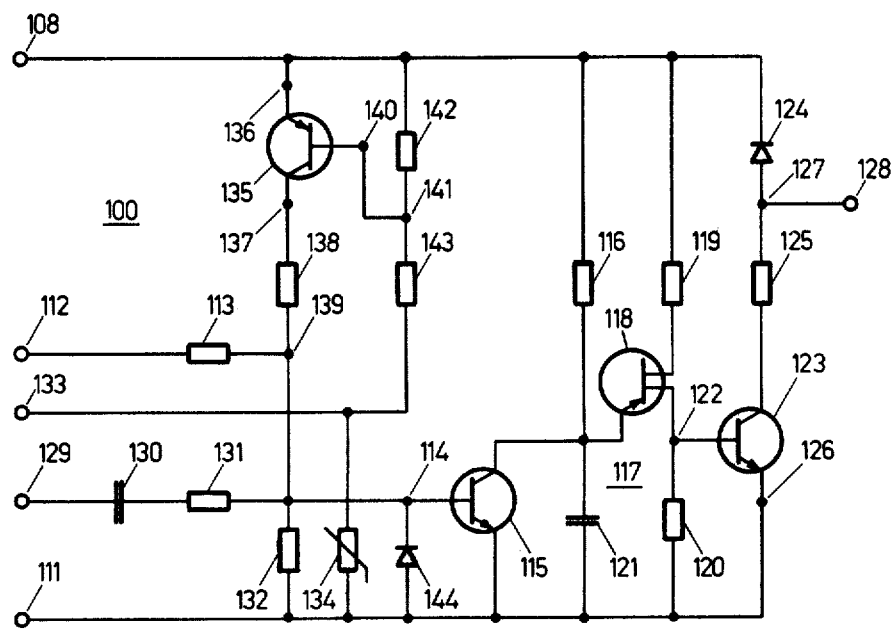
FIG. 5 is a circuit diagram of an embodiment of a first control member.

FIG. 5 shows a circuit diagram of an embodiment of a control member 100 of the control arrangement 23. This control member 100 has the task of switching on the first controllable switch, which in the present embodiment is accomplished by the firing of the first thyristor 11, to initiate the charging process of the capacitor 2. For this purpose, a logical "0" signal is transmitted to the control member 100 at its input 112 from the other control member 200, as will be explained later in connection with FIG. 6, with the capacitor 2 discharged. This logical "0" signal passes via a resistor 113 to the base 114 of a transistor 115. This means that no base current is transmitted to the transistor 115, and it is thus not conducting and presents no short circuit to the capacitor 121 which is connected thereafter. An oscillator 117, formed by resistor 116, unijunction transistor 118, resistors 119 and 120 and the capacitor 121, can, accordingly, oscillate freely.

The oscillator 117 supplies current impulses to the base 122 of a transistor 123. The collector current is transmitted to the transistor 123 from the positive supply point 108 via the firing transformer 105 (FIG. 4), the output 128 and a current-limiting resistor 125. The emitter 126 of the transistor 123 is connected to the negative supply point 111. The current pulses, increased in the transistor 123, are transmitted from the connection point 127 at an output 128 of the control member 100 (also see FIG. 4) and thereby via the primary winding of the firing transformer 105 to the positive supply point 108. The firing pulses produced in the secondary winding of the firing transformer 105 fire the first thyristor 11 via the gate resistor 101, and thereby allow the charging process of capacitor 2.

If the frequency of the oscillator 117 is chosen to be substantially higher than the mains frequency, then a synchronization of the firing pulses with the mains frequency is unnecessary, because in fact the thyristor 11 is fired very early within each half period of the mains frequency. The diode 124 in the control member 100 protects the thyristor in a known way against inductive voltage peaks which are too high and which come from the firing transformer 105 connected thereafter.

The control member 100 also serves to cause a short delay in a new charging process after the capacitor 2 has been discharged by igniting the flash lamp 44. By this means, the so-called cross-arcing of the flash lamp because of ionization which still exists is avoided. Cross-arcing of this kind would in fact be very damaging to the flash lamp.

This short interruption of the charging process comes about in the following way. As a result of the discharging process of capacitor 2, the potential at the cathode 48 of the flash lamp 44 rises quickly towards the potential at its anode, that is, towards the potential of the positive terminal 10 of capacitor 2 and thereby, the potential of the conduction line 109 connected to it, which is also connected to the negative supply point 111 of the control member 100.

An input 129 of the control member 100 is connected to the conduction line 5 which leads to the cathode 48 of the flash lamp 44 (see FIG. 4), whereby also the potential at the input 129 rises erratically after ignition of the flash lamp 44. Subsequently, capacitor 130 (see FIG. 5), which was charged to the full charging voltage of the capacitor 2 before the ignition of the flash lamp, is discharged via resistors 131 and 132.

During this discharging process, the transistor 115 receives a base current, is thereby rendered conductive, and short circuits the capacitor 121 of the oscillator 117. The oscillator 117 thus no longer oscillates and no longer supplies any further pulses to the firing transmitter 105 via the transistor 123. In the sequence, the first thyristor 11 is not fired, so that the charging process of the capacitor 2 cannot for the time being commence.

By this means the flash lamp 44 has sufficient time for the ionization to reduce, whereby a cross-arcing of the flash lamp is made impossible.

If a flash gun is required to rapidly produce a large number of successive flashes, then the danger of overheating the flash lamp exists, whereby the length of its life would be greatly shortened. In order to avoid this, the resistor 55, which has a negative temperature coefficient, is set up adajcent the flash lamp 44 (see FIG. 4). The current which is influenced by this resistor 55 and its temperature dependence, passes via the conduction line 57 (see FIG. 4) to a further input 133 (see FIGS. 4 and 5) of the control member 100. Between the further input 133 and the negative supply point 111 a varistor 134 is connected to protect a transistor 135 from possible surges which could be induced in the resistor 44 during the flash process.

The transistor 135 is positioned with its emitter 136 at the positive supply point 108, while its collector 137 is connected to the connection point 139 of the resistors 113 and 132 via a collector resistance 138. The base of the transistor 135 is connected to voltage divider point 141 of a voltage divider which lies between the positive supply point 108 and the input 113 of the resistors 142 and 143.

If the flash lamp 44 heats up too much because of an intolerably-high number of successively-released flashes, then due to the negative temperature coefficient of the resistor 55 (see FIG. 4), the current which flows through it to the input 133 rises. By this means, the current also rises through the transistor 135 and a base current is transmitted to the transistor 115. Hereby, the transistor 115 becomes conducting and causes, in a manner which has already been described, the oscillator 117 to stop. Thus, no further firing pulses for the first thyristor 11 (see FIG. 4) are produced, which means that the charging process of the capacitor 2 is interrupted until the flash lamp 44 and the resistor 55 have cooled off sufficiently. By this means, when the flash lamp becomes too hot, no further dischargings of the capacitor 2 can take place.

As has been mentioned, the production of firing pulses is controlled for the first controllable switch 11 via the base 114 of the transistor 115. During the charging of the capacitor 2, in order to prevent the base potential of the transistor 115 from falling too far below the emitter potential of the transistor 115, which could lead to intolerably-high currents in its base region, a diode 144 is located between the base 114 and the negative supply point 111.

Figure 6:
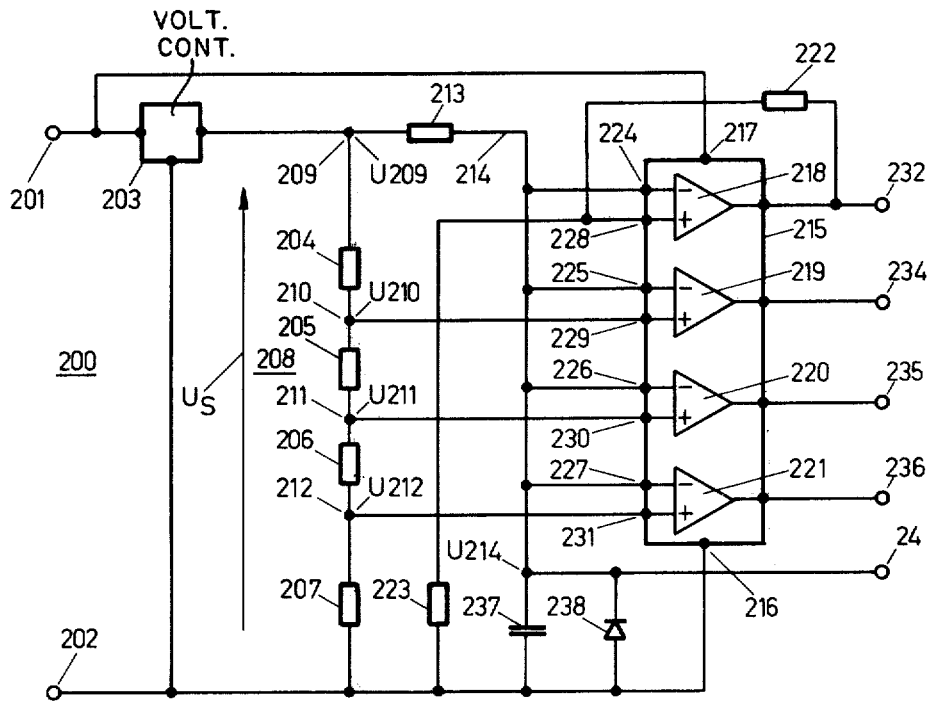
FIG. 6 is a circuit diagram of an embodiment of a second control member.

FIG. 6 shows a circuit diagram of an embodiment of a control member 200 of the control arrangement 23. The task of the control member 200 is to produce the control signals which are necessary for the successive switching on of the controllable switches 11, 13, 15 and 17. These control signals are produced in dependence on the charging voltage at the capacitor 2 which is to be charged, wherein just as many voltage comparison stages are provided as there are controllable switches (11, 13, 15, 17) or charging resistors (12, 14, 16, 18).

The control member 200 is on one side connected by its positive supply point 201 with the conduction line 106 (see FIG. 4), which leads to the positive terminal of the rectifier 37; and, on the other side, its negative supply point 202 is connected with the conduction line 109 (see FIG. 4) which leads to the negative terminal of the rectifier 37.

A voltage control 203, for example, Motorola type 7815, conducts a stabilized supply voltage $U_S$ of, for example, 15 V, a voltage divider 208 consisting of the resistors 204, 205, 206 and 207. At the connecting point 209 is a potential $U_{209}$, at the connecting point 210 is a potential $U_{210}$, at the connecting point 211 is a potential $U_{211}$ and at the connecting point 212 is a potential $U_{212}$.

The connecting point 209 is connected via a resistor 213 and a conduction line 214 to the control input 24, and over this path a control voltage is conducted, which is dependent upon the charging voltage of the capacitor 2 to the control arrangement (see FIG. 4). Thus, the conduction line 214 also carries a potential which is dependent on the respective charging condition of the capacitor 2.

At the beginning of a charging process of the capacitor 2, its charging voltage is still zero, this means that the negative terminal 6 of the capacitor 2 and the conducting line 5 connected to it still conducts at the same potential as the positive terminal 10. Since this positive terminal 10 is, however, also connected to the negative supply point 202 of the control member 200 via the conduction line 109, a positive potential results from the voltage division of the potential $U_{209}$ at the connecting point 209 via the resistor 213 to the control input 24, via the resistor 42 (FIG. 4) to the potential of the connecting point 41. In the present example, it was assumed that the potential $U_{209}$ amounts to $+15$ V. At the beginning of the charging process, there is still no charging voltage across the capacitor 2; consequently, at the beginning of the charging process, the potential on the conduction line 214 results in a voltage drop across the resistor 213 lower than $+15$ V. During the charging process, the charging voltage at capacitor 2 rises, as was mentioned earlier, over the values $U_1$, $U_2$, $U_3$ and finally to the value $U_4$. Proportionately to these values, the potential at the connecting point 41 (FIG. 4) also changes with respect to the designated zero potential of the supply point 202 in the negative direction. The potential $U_{214}$ of the conduction line 214 thus falls during the charging process because of the chosen resistance value with respect to zero potential. This potential $U_{214}$ is directly dependent on the instantaneous charging voltage at capacitor 2.

A four-fold operational amplifier 215 common in the trade, for example, in an integrated construction, is positioned with its negative supply point 216 at the negative supply point 202 of the control member 200, and with its positive supply point 217 at the positive supply point 201 of the control member 200. The four-fold operational amplifier 215 contains the four operational amplifiers 218, 219, 220 and 221. These operational amplifiers provide threshold value steps for the comparison of the potential $U_{214}$ with the steady potential values $U_{210}$, $U_{211}$ and $U_{212}$, which are produced via the voltage divider 208, as well as with the potential relating to the negative supply point 202.

In a way known per se, a definite hysteresis is produced in the transmission characteristic of the operational amplifier 218 by the resistors 222 and 223.

At the time $t_0$, the output 232 of the operational amplifier 218 carries the logical "0" signal. At the time $t_1$ (FIGS. 2, 3), the charging voltage reaches the value $U_1$ and thereby the potential $U_{214}$ reaches the switching threshold $U_{210}$ of the operational amplifier 219, so that its output 234 jumps to the logical "1" condition. The logical "1" signal is carried from the output 234 of the control member 200 (FIG. 4) via the second gate resistor 102 to the second thyristor, which forms the second controllable switch 13. This second charging resistor 14 is connected in parallel with first charging resistor 12, and the charging current takes up the value $J_0$ again (FIGS. 2, 3).

Subsequently, the charging voltage climbs again until at the time $t_2$ it reaches the value $U_2$, whereby the potential $U_{214}$ also reaches the switching threshold $U_{211}$ of the operational amplifier 220. Through this its output 235 jumps to the logical "1" condition. The logical "1" signal is now carried from output 235 of the control member 200 (FIG. 4) via the third gate resistor 103 to the third thyristor which forms the third controllable switch 15. By this means, the third charging resistor 16 is likewise connected in parallel with the first and second charging resistors 12 and 14 which have already been connected in parallel, and the charging current takes up the value $J_0$ again (FIGS. 2, 3). The charging voltage rises again up to time $t_3$ when the value $U_3$ is reached, whereby the potential $U_{214}$ also reaches the switching threshold $U_{212}$ of the operational amplifier. Thereby, its output 236 jumps to the logical "1" condition. The logical "1" signal is now carried from the output 236 of the control member 200 (FIG. 4) via the fourth gate resistor 104 to the fourth thyristor, which forms the fourth controllable switch 17. By this means, the fourth charging resistor 18 is likewise connected in parallel with the charging resistors 12, 14, and 16 which have already been connected in parallel, and the charging current takes up the value $J_0$ again (FIGS. 2, 3).

After a further space of time, the charging voltage of the capacitor 2 finally reaches the value $U_4$, that is the intended full charging voltage, and at the same time the potential $U_{214}$ reaches the switching threshold of the operational amplifier 218. By this means, the output 232 of the operational amplifier 218 switches to the logical "1" condition. The logical "1" signal is carried from the output 232 via the conduction line 233 at the input 112 of the control member 100 (FIG. 4) and causes, as was described earlier, the blocking of firing pulses for the first thyristor, which forms the first controllable switch 11. Thereby, the charging process of the capacitor 2 is interrupted at the next zero traverse of the current through the first thyristor 11, and the capacitor 2 is charged to its final charging voltage $U_4$.

To protect the operational amplifiers 218, 219, 220 and 221 against possible excess voltage, another capacitor 237 and a diode 238 are connected between the conduction line 214 and the negative supply point 202.

If the switch 54 (FIG. 4) is closed temporarily when the capacitor 2 is charged, the capacitor 50 is suddenly discharged, the current pulse which then flows produces in the secondary winding 47 of the ignition transformer 46 the starting voltage for the ignition of the flash lamp 44. Through the ignition of the flash lamp 44, the capacitor 2 is discharged and, as was described earlier, after a short pause for the deionization of the flash lamp, a renewed charging takes place automatically.

As was described earlier, where the flash lamp 44 becomes intolerably heated, which is caused by too many fast, successive ignitions, the rise in the temperature of the flash lamp 44 and of the resistor 55 acts so as to control the further charging of the capacitor 2 so as to produce a temporary blockage.

What is claimed is:

1. Apparatus for charging a capacitor comprising a source of direct current, a primary switch, variable impedance means connected in series with said primary switch across said capacitor, first control means responsive to the terminal voltage of said capacitor for closing said primary switch, and second control means responsive to the terminal voltage of said capacitor for controlling the impedance of said variable impedance means so as to regulate the charging current of the capacitor to be a substantially constant value.

2. Apparatus according to claim 1, wherein said first control means comprises actuating means for closing said primary switch and delay means responsive to the terminal voltage of said capacitor produced subsequent to discharge thereof for inhibiting said actuating means.

3. Apparatus according to claim 1, wherein said variable impedance means comprises a plurality of parallel impedance paths each including a resistor of different value from the resistors in the other paths and a plurality of secondary switches responsive to said second control means for enabling a respective one of said parallel impedance paths.

4. Apparatus according to claim 3, wherein all but one of said variable impedance paths includes a secondary switch in series with one of said resistors.

5. Apparatus according to claim 4, wherein said second control means includes means for turning on said secondary switches in a predetermined sequence.

6. Apparatus for charging a capacitor which is connected to a flash tube for selectively discharging said flash tube comprising a source of direct current, a primary switch, variable impedance means connected in series with said primary switch across said capacitor, first control means responsive to the terminal voltage of said capacitor for closing said primary switch, second control means responsive to the terminal voltage of said capacitor for controlling the impedance of said variable impedance means, means for detecting the temperature of said flash tube, and means for inhibiting operation of said first control means when the temperature of said flash tube exceeds a predetermined value.

7. Apparatus according to claim 6, wherein said variable impedance means comprises a plurality of parallel impedance paths each including a resistor of different value from the resistors in the other paths and a plurality of secondary switches responsive to said second control means for enabling a respective one of said parallel impedance paths.

8. Apparatus for charging a capacitor which is connected to an electrical device for selectively discharging said electrical device comprising a source of direct current, a primary switch, variable impedance means connected in series with said primary switch across said capacitor, first control means responsive to the terminal voltage of said capacitor for closing said primary switch, second control means responsive to the terminal voltage of said capacitor for controlling the impedance of said variable impedance means, means for detecting the temperature of said electrical device, and means for inhibiting operation of said first control means when the temperature of said electrical device exceeds a predetermined value.

9. Apparatus according to claim 8, wherein said variable impedance means comprises a plurality of parallel impedance paths each including a resistor of different value from the resistors in the other paths and a plurality of secondary switches responsive to said second control means for enabling a respective one of said parallel impedance paths.

10. Apparatus for charging a capacitor which is connected to a flash tube comprising a source of direct current, a primary switch, variable impedance means connected in series with said primary switch across said capacitor, first control means responsive to the terminal voltage of said capacitor for closing said primary switch, and second control means responsive to the terminal voltage of said capacitor for controlling the impedance of said variable impedance means so as to regulate the charging current of the capacitor to be a substantially-constant value.

11. Apparatus according to claim 10, wherein said first control means comprises actuating means for closing said primary switch and delay means responsive to the terminal voltage of said capacitor produced subsequent to discharge thereof for inhibiting said actuating means.

12. Apparatus according to claim 10, wherein said variable impedance means comprises a plurality of parallel impedance paths each including a resistor of different value from the resistors in the other paths and a plurality of secondary switches responsive to said second control means for enabling a respective one of said parallel impedance paths.

13. Apparatus according to claim 12, wherein all but one of said variable impedance paths includes a secondary switch in series with one of said resistors.

14. Apparatus according to claim 13, wherein said second control means includes means for turning on said secondary switches in a predetermined sequence.

* * * * *